(12) United States Patent
Gray et al.

(10) Patent No.: US 6,980,381 B2
(45) Date of Patent: Dec. 27, 2005

(54) APPARATUS AND METHOD FOR PREDICTING FAILURE OF A DISK DRIVE

(75) Inventors: William F. Gray, 4985 Hwy. A1A, Melbourne Beach, FL (US) 32951-3206; Ralf Brown, Pittsburgh, PA (US)

(73) Assignee: William F. Gray, Melbourne Beach, FL (US)

( * ) Notice: Subject to any disclaimer, the term of this patent is extended or adjusted under 35 U.S.C. 154(b) by 868 days.

(21) Appl. No.: 09/839,585

(22) Filed: Apr. 23, 2001

(65) Prior Publication Data

US 2002/0053046 A1 May 2, 2002

Related U.S. Application Data

(63) Continuation-in-part of application No. 09/157,382, filed on Sep. 21, 1998, now Pat. No. 6,249,887.

(51) Int. Cl.⁷ .............................................. G11B 27/36
(52) U.S. Cl. ....................................................... 360/31
(58) Field of Search ............................... 360/31, 73.03, 360/64, 75; 714/47, 41–44, 48, 56, 57; 324/212

(56) References Cited

U.S. PATENT DOCUMENTS

| | | | |
|---|---|---|---|
| 4,103,338 A | 7/1978 | Cizmic et al. | |
| 4,268,905 A | 5/1981 | Johann et al. | |
| 4,348,761 A | 9/1982 | Berger | |
| 4,623,942 A | 11/1986 | Kraus et al. | |
| 4,904,938 A | 2/1990 | O'Reilly et al. | |
| 4,949,036 A | 8/1990 | Bezinque et al. | |
| 4,979,055 A | 12/1990 | Squires et al. | |
| 5,068,851 A | 11/1991 | Bruckert et al. | |
| 5,109,304 A | 4/1992 | Pederson | |
| 5,157,781 A | 10/1992 | Harwood et al. | |
| 5,185,881 A | 2/1993 | Brooks et al. | |
| 5,237,551 A | 8/1993 | Ogawa et al. | |
| 5,257,255 A | 10/1993 | Morimoto et al. | |
| 5,355,121 A | 10/1994 | Naito et al. | |
| 5,422,890 A | 6/1995 | Klingsporn et al. | |
| 5,479,651 A | 12/1995 | Nakaguchi | |
| 5,539,270 A | 7/1996 | Kaji et al. | |
| 5,557,183 A | 9/1996 | Bates et al. | |
| 5,661,615 A | 8/1997 | Waugh et al. | |

*Primary Examiner*—David Hudspeth
*Assistant Examiner*—Glenda P. Rodriguez
(74) *Attorney, Agent, or Firm*—Cahn & Samuels, LLP

(57) ABSTRACT

A system for predicting failure of a disk is provided. A test string of performance sensitive reads is built and calibrated. That is, the positioning time and spindle speed for each performance sensitive read is logged. The test string is then applied to a disk and the positioning time and spindle speed for each performance sensitive read, as applied, is measured. The calibrated positioning times and spindle speeds are then compared with the measured positioning times and spindle speeds. The comparison result is used as a reliable predictor for disk failure.

19 Claims, 12 Drawing Sheets

DISK DRIVE OVERVIEW &COMPUTER INTERFACE

DISK DRIVE OVERVIEW &COMPUTER INTERFACE

FIG. 2
DUAL ACCESS READ—NO LATENCY
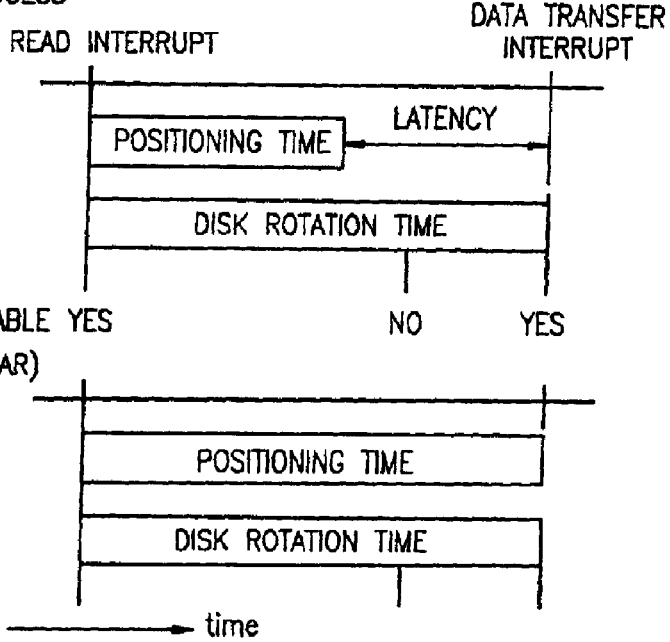
FIG. 3
AMPLIFYING POSITIONING VARIANCE—MEASURE REVOLUTION TIME
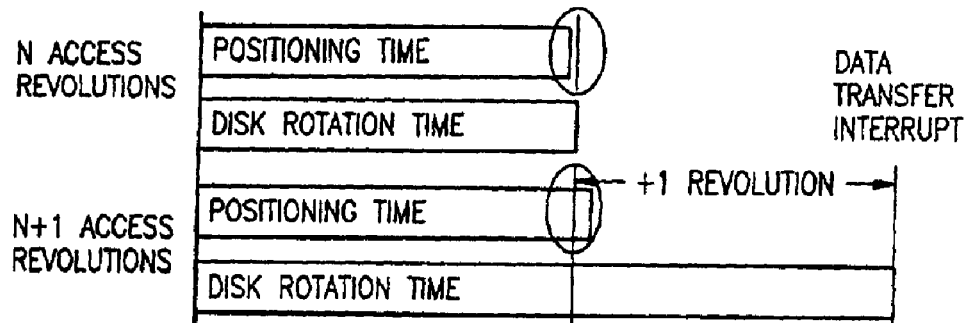
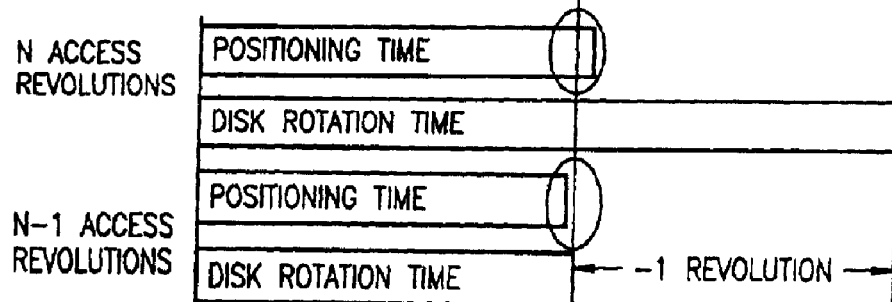

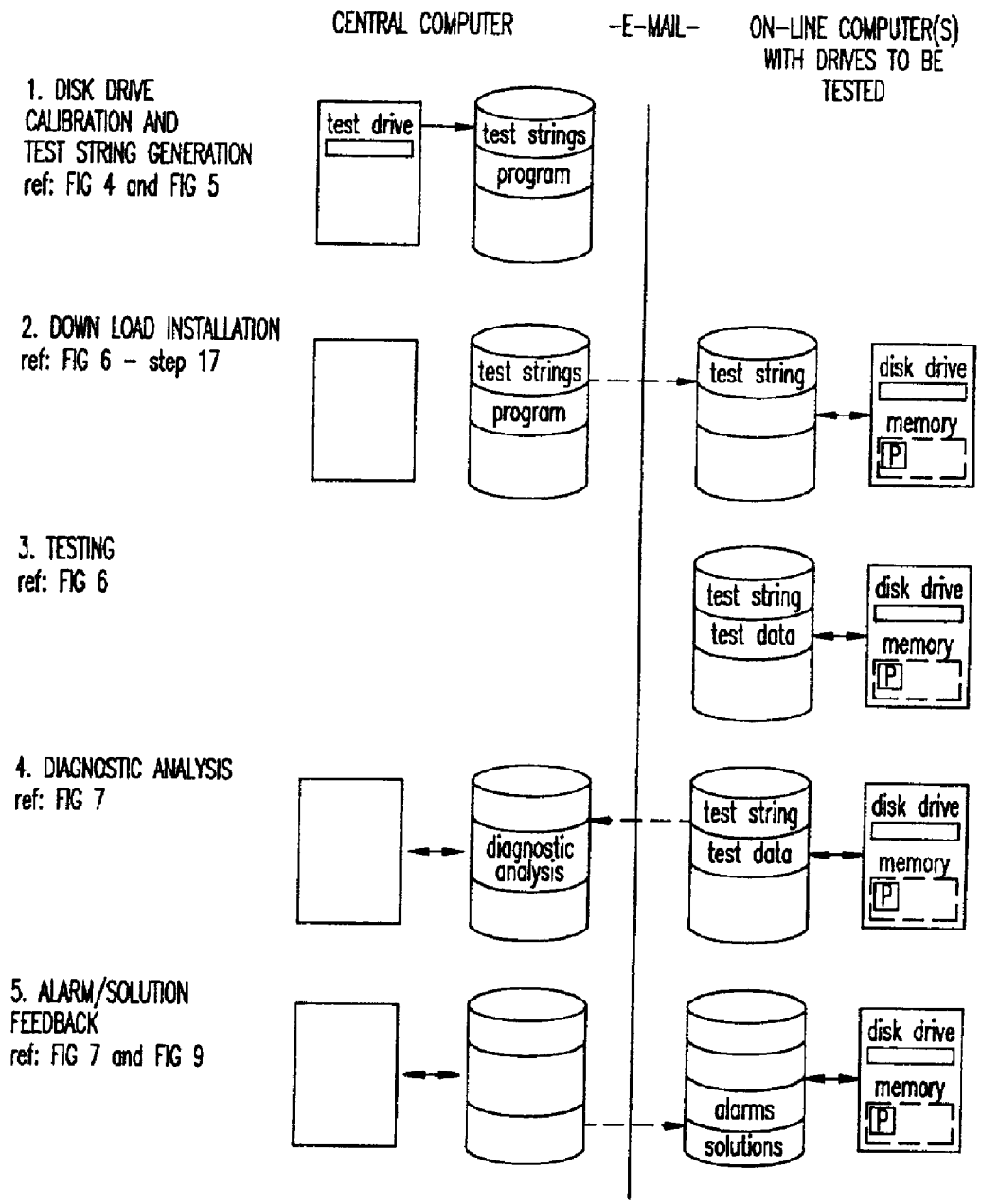

BUILDING DUAL ACCESS READ(DAR) INVENTORY FOR "CREEP" AND "SWEEP" ACCESS PATTERNS

GENERATING AND CALIBRATING READ TEST STRINGS

TEST ANALYSIS AND FAULT SOLUTIONS

PROBABILITY OF 10-DAR MEASUREMENT
READ CALIBRATION: 58% FAST, 42% SLOW

The probability sum of the 11 possible outcomes is 100%

APPARATUS AND METHOD FOR PREDICTING FAILURE OF A DISK DRIVE

CROSS REFERENCE TO RELATED APPLICATIONS

This application is a continuation-in-part of application Ser. No. 09/157,382 filed Sep. 21, 1998, now U.S. Pat. No. 6,249,887.

FIELD OF THE INVENTION

This invention relates to the field of data storage using disk drives, for example, magnetic disk drive data storage. More specifically, the invention pertains to the field of predicting failure of a disk drive by monitoring a test string of performance sensitive read operations.

BACKGROUND OF THE INVENTION

Personal computers (PC's) have become increasingly more powerful during recent years and are utilized for a variety of applications in industry, business and education. Such varied uses result in different requirements for various subsystems that form the PC. As applications become more complex, the storage requirements for PC's increase. Thus, it is now common for PC's to include hard disks having a storage capacity of as much as 60 gigabytes or more and capacities continue to increase. Recently, disk drives have been employed in a variety of secondary devices other than PCs including consumer electronic devices, medical devices, industrial devices, scientific devices and military devices. These devices typically employ miniature disks having a form factor of about 2.5 cm (1 inch).

Information is stored on disks in a plurality of concentric circular tracks by an array of transducers, or heads (usually one per disk surface) mounted for movement to an electronically controlled actuator mechanism. The storing of information on the disks is sometimes also referred to as "writing", and the subsequent retrieval of information from the disks is also called "reading".

Over time, hard disks tend to develop a number of defects. Some defects are attributable to user manageable causes such as radiation, temperature, moisture, pressure, impact and vibration. Other defects are attributable to mechanical failure of one or more components of the disk drive assembly such as the spindle, the arm and other mechanical components.

Currently, there are computer programs for testing computer peripheral storage media, particularly rotating magnetic storage media, to determine whether there are areas that are bad or marginal with respect to storing data with integrity. Many of these programs accomplish the task by writing and reading areas of a storage medium repeatedly to determine the reliability of these areas. If an area does not meet some selected threshold of reliability, then the area is marked bad and data is relocated if possible. These programs are designed to test the disk drive prior to sale of the disk drive and/or prior to incorporating the disk drive into the computer system. These programs tend to be customized for a particular make and model of disk and are not typically generically applicable.

U.S. Pat. No. 5,422,890 discloses a system and method that captures and characterizes error information during disk tests. The system is capable of dynamically determining whether the disk under test has exceeded acceptable error rates based on an actual number of bytes read. The system saves error log information, including specific sector addresses, error rates, error types and data patterns. This system is sometimes referred to as a software-only monitor.

Other software-only monitors are known. However, they are limited to timing signals between a host microprocessor and the drive controller. These signals are predominantly sensitive to variations of disk rotation speed that, because of their high regulation, do not furnish any practical early warning of trouble. When the disk spindle has serious bearing wear or lack of lubricant, the drive controller increases power to overcome the resultant mechanical grinding. As a result, disk failure is hastened in a manner that is not readily detectable.

In the manufacture of disk drives, it is not unusual for tens of thousands of disk drive units to be fabricated daily. With such high numbers of disk drives being made, it is apparent that a certain number of units will fail to meet the design specifications, due to faulty components, improper assembly, contamination, and other elements familiar to those of skill in the art. While every effort is made by disk drive manufacturers to minimize these defective units and assembly errors, a small percentage of defective units will inevitably be built. When the defect is introduced into the unit at an early stage in the manufacturing process, the fault may not be detected until a much later stage of the process. Such a delay in the detection of defective assemblies can result in a significant amount of labor costs when taken over the large numbers of units being manufactured.

U.S. Pat. No. 5,557,183 discloses a method and apparatus for predicting failure of a disk drive based upon electrical power consumption. This system is capable of determining when a disk drive may fail and entrap the stored data. Like other patents that detect dynamic anomalies as opposed to media failures, it requires new hardware and embedded code added to the disk drive during the manufacturing process (at the factory).

Another example of the "factory-installed" approach to disk drive failure prediction is S.M.A.R.T. (Self-Monitoring Analysis and Reporting Technology) technology. S.M.A.R.T. is a technology, implemented in microcode, that is designed to enable a hard drive to predict impending catastrophic failure. It has become a standard covering sensing and reporting of hard drive dynamic performance. It is a combination of Compaq's Intellisafe and IBMs Predictive Failure Analysis (PFA). One of the drawbacks to S.M.A.R.T. is that special, customized hardware is needed to allow users to effectively employ S.M.A.R.T.

Declining disk drive costs reduce the need for sophisticated evidence before making a disk drive replacement decision. When S.M.A.R.T. was originally conceived, disk drive storage was relatively expensive and a decision to replace a suspect disk drive required detailed evidence of potential failure. The cost of disk drive storage has dramatically fallen since the development of S.M.A.R.T. and continues to decline steadily.

IBM has also received several patents relating to prediction of drive failure. U.S. Pat. No. 5,410,439 describes a device that generates predictions of drive failure based on head/disk clearance or flying height.

U.S. Pat. No. 5,539,592 describes a device that measures torque at the actuator motor or change in speed of the spindle motor. Those measurements are compared to historical data taken from a healthy drive to predict failure.

U.S. Pat. No. 5,612,845 describes a device for predicting spindle motor failure. This device uses "readback" signals to detect the existence and magnitude of spindle motor bearing assembly degradation. The patent defines a "readback "

signal as a signal generated by magnetic transitions developed on the disk as the read element passes over the disk tracks.

The forgoing known methods of predicting disk drive failure using factory installed components are disadvantageous for a number or reasons. One problem is that there is a high cost of operation. The drive assemblies require additional hardware, which necessarily increases drive costs at a time when the drive industry is suffering strong price erosion due to vigorous competition. Another problem is that the factory-installed approach has limited application. Drives already shipped cannot be tested without a return trip to the factory. Thus, absent an industry wide agreement, competitive drives cannot be monitored against each other. Still another problem is that there is an increased risk of error due to the possibility of failure of the additional hardware. A further problem is that the factory-installed systems are difficult to maintain because when there is a sensor or other hardware problem, the drive must be sent back to the factory. Yet another problem is that smaller drives do not have room for additional hardware, e.g., sensors. In addition, smaller drives cannot dissipate heat created by additional hardware. Still a further problem is that some systems require specially-formatted dedicated test tracks in order for testing to be performed.

Accordingly, there is a need for a generic disk failure prediction system that overcomes the above-mentioned problems and provides a reliable indication of the state of the disk and alerts appropriate personnel when the disk becomes faulty.

SUMMARY OF THE INVENTION

This invention predicts and diagnoses the future failure of a computer's disk drives due to deficiencies in the disk drives' mechanical systems, namely, the spindle drive, the actuator arm and the internal environment in which they operate. An increase in one or more of these deficiencies, typically a result of manufacturing defects, poor operating environment and/or excessive wear, is used to predict drive failure and to recommend corrective user action. This invention may be realized by downloading software from a remote computer to virtually any on-line PC. Alternatively, the invention may be realized by directly programming a local computer (PC) by, e.g., loading software from a readable medium such as a floppy disk or CD ROM or by providing the computer with a pre programmed chip.

State-of-the-art disk drives that incorporate systems for the early warning of mechanical and environmentally caused failure typically require special factory-installed hardware and/or drive controller logic code. This limits their applicability and maintenance and adds to disk drive production and service costs. Past efforts to develop generic down loaded solutions, such as this invention, have been unsuccessful primarily because the operational signals necessary to accurately detect most operating deficiencies before they cause a drive failure are restricted to the disk drive processor and are not available to the computer CPU or the computer user.

A feature of this invention is that it synthesizes internal, fault-sensitive, disk drive signals at the computer CPU level enabling prediction and diagnosis of the future cause of failure without the need for special factory installed hardware or code and in a form that can be efficiently installed by downloading software to virtually any networked PC. It predicts future failure of a disk drive by analyzing the disk's ability to execute performance sensitive read operations consistently over time. More particularly the invention creates a test string of reads for a disk, preferably when the disk is new. Each test read, known as a dual access read or DAR, has two possible read times under fault-free conditions, one a single revolution time shorter than the other. These read times are respectively designated as fast and slow. The CPU-available read times for fast and slow possibilities, the resulting revolution time calculated by subtracting the two read times, and the ratio between fast and slow possibilities are recorded from multiple DAR repetitions and saved as input for a test read calibration.

Still another feature of this invention is that it synthesizes the fault-sensitive actuator arm positioning time, which is unavailable to the CPU without special hardware, by selecting DARs where the CPU-available read start interrupt to data transfer start interrupt time is approximately equal to the desired positioning time. This occurs when the traverse time of the actuator arm to reach the next read record is the same as the disk rotation time to bring the record to the read/write head. This invention identifies such test reads when multiple DAR repetitions yield an equivalent amount of fast and slow read times.

In accordance with an aspect of the invention, when preparing a string of test reads, a probability of occurrence of a particular ratio between fast and slow repetitions of each test read may be calculated as a no-fault calibration. The use of this binary-based probability forms a common datum for different test reads and allows new test reads to be substituted without affecting the invention's calculated results. Subsequently, when the test reads are executed during a test, their probability of occurrence is calculated and compared to the probabilities of the calibration. The degree of variance between the calibration and test probabilities is directly proportional to the degree of risk that the drive will fail.

The invention's use of probability allows the replacement of test reads that produce erroneous results caused by fault-free but transient operation of PC subsystems without compromising the statistical history of the drive. The two calibrated read times, fast and slow, are used to identify and replace very short test reads that are caused by the intermittent effect of cache or memory-to-memory read accesses. Test reads involving test sectors relocated by disk media maintenance routines and the like are similarly identified and replaced. When an anomalous RPM time is detected during the calibration of a DAR, the DAR is replaced. When an anomalous RPM time is detected during test it is logged as a spindle alarm and overrides any access arm or environmental alarms that might happen during the same time as a result of the anomalous rotation.

Test reads preferably include different actuator traverse patterns to detect and diagnose the difference between probable failures caused by the deficiencies in the actuator arm mechanical system and those caused by a defective internal atmospheric environment in which the actuator and read/write head operate. Short traverses known as creeps emphasize the effects of actuator arm mechanical faults and de-emphasize environmental faults. Long traverses known as sweeps do the reverse and emphasize environmental faults while de-emphasizing mechanical faults.

Verification that the invention is installed and working on a computer may be conveniently obtained by tilting the computer on its side and generating an alarm. This tilt test detects the effects of different gravitational forces of the actuator arm.

An advantage of this invention is that disk drive warranty providers can use it to provide replace-before-failure warrantees, an upgrade of their present replace-after-failure (and loss of user data) warrantees. This invention also reminds PC users when their disk drive should be replaced and presents the users with corrective options which may be conveniently investigated and ordered over the network.

BRIEF DESCRIPTION OF THE DRAWINGS

FIG. 2 is a diagram showing the relationship between positioning time, rotational latency and disk rotation time in a typical disk read operation.

FIG. 3 is a diagram showing the relationship between positioning time for dual access reads and disk rotation time.

FIG. 3A is a diagram showing the relationship between a central computer and a remote unit under test at various stages of testing.

DETAILED DESCRIPTION OF THE DRAWINGS

This invention pertains to any disk drive host, e.g., computers, consumer electronic devices, medical devices, military devices, etc., that, without special hardware modification, can track the reliability of disk drives for the purpose of predicting disk drive failure. More specifically, this invention monitors and diagnoses the performance of disk drive mechanical systems, e.g., the spindle and the actuator arm drive and monitors the quality of the environment in which they interact. This invention synthesizes, at the CPU level, the actuator arm positioning time and disk revolutions per second. These fault-sensitive functions are available at the disk drives' internal processor level and are not available to the CPU. In state-of-the-art disk drive failure prediction systems this information is typically transmitted to the CPU level with the addition of special hardware. This invention's process of synthesizing the finite internal disk performance from the gross start-stop interrupt signals available to the CPU enables it to be remotely installed and maintained by simply down loading software to virtually any on-line microprocessor-driven host.

Figure 1:
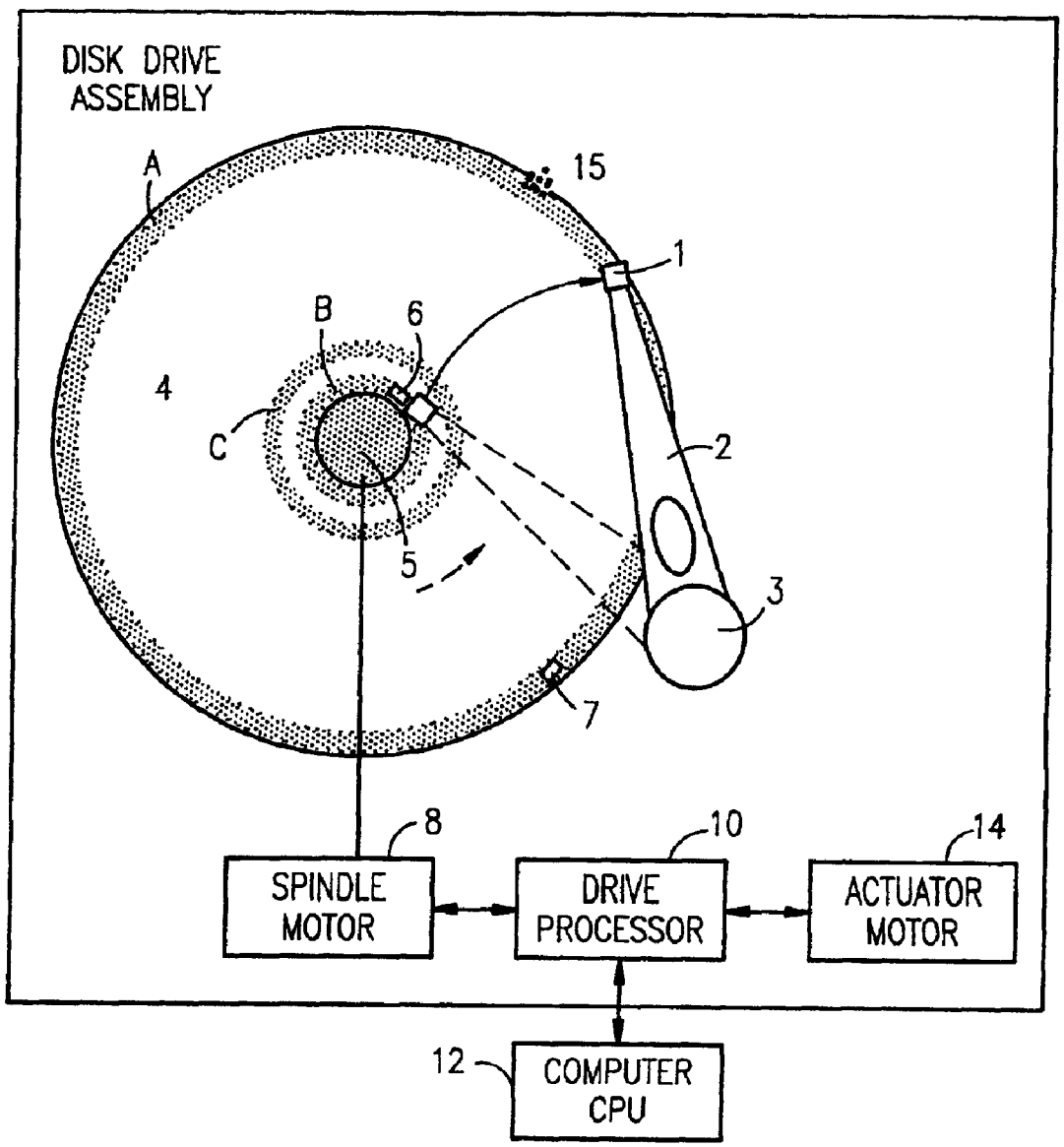
FIG. 1 is a top view of a disk drive assembly incorporating the invention.

It is an object of this invention to detect minuscule operating variances indicative of future drive failure in the fault-sensitive synchronization between the rotating disk and the traversing actuator arm. This invention effectively amplifies the measurable effect of these minuscule variances by selecting test reads which due to these minuscule variances will add or delete a 360 degree disk revolution to the read time. FIG. 1 is a simplified top view of a disk drive assembly and its interface with a computer CPU. The read/write heads or transducers 1 are mounted at the end of an actuator arm 2. The heads 1 are traversed to the desired disk track A by selective control of an actuator motor 14. The disks 4 are conventionally mounted on a spindle 5 that is rotated, typically counterclockwise, by the spindle motor 8. A disk drive processor 10, using a feed back process, controls the spindle 5 to a near-constant speed generally within +0.1% or −0.1% of rated speed that is typically from 3600–10000 RPM. The spindle 5 usually supports a number of disks 4 in a stack wherein all similar numbered tracks lie generally in alignment in what is called a cylinder. Data on a track is arranged in sectors typically containing 512 data bytes. This invention may be implemented in computers having disk drives with multiple disks 4 and computers with multiple disk drives.

In a typical read operation, such as reading sector 7 on track A after reading sector 6 on track B, the computer CPU 12 issues a read command to the disk drive processor 10. The disk drive processor 10 informs the actuator motor 14 to traverse the arm from track B shown as a dotted line arm to track A after the reading of sector 6. The positioning time, FIG. 2, includes the time from the CPU 12 read interrupt command to when the read/write head 1 is properly positioned and in a read-ready state over track A. Typically there is no signal at the conclusion of the positioning time from the disk drive processor 10 to the computer CPU 12. The properly positioned read/write head 1 then waits over track B for the spindle motor 8 to rotate sector 7 under it. This waiting period, which is terminated by the beginning of reading sector 7, is known as rotational latency. The drive processor then informs the computer CPU 12 when the data starts transferring from the disk surface to the read head 1 via an interrupt signal. The computer CPU 12 uses this interrupt signal to deallocate itself from the disk reading process and to continue the processing tasks it served before the read request.

Unfortunately this data transfer start interrupt and the disk rotation time it helps define, FIG. 2, is not normally affected by conditions that will eventually cause a failure. This is because the spindle motor 8 is closely controlled by the drive processor to provide a constant rotational speed. The effects of worn spindle bearings, lack of spindle lubricant, and other causes of spindle failure are masked in part by the constant speed control function which typically increases spindle motor 8 power to overcome the resulting friction and maintain constant RPM.

In contrast, the positioning time, FIG. 2, while unavailable to the computer CPU 12, is highly sensitive to the early effects of failure causing conditions. This is primarily due to what those skilled in the art call the settling in period that concludes the positioning time. The settle in period is the time to stabilize the read head 1, once the actuator arm 2 has arrived properly over the read track, e.g., track A, in a read ready position. Settle times are increased by exposure to a degraded internal environment, defective functioning of the actuator system and/or defective functioning of the spindle 5. When the actuator arm 2 and head 1 are accelerated during the track to track traverse by the actuator motor 14 when leaving track B and then decelerated shortly before arriving at track A, the actuator arm 2 and the head 1 tend to oscillate making initial reading problematical. Once this oscillation has been dampened and the head 1 has settled, reading of track data can begin and the positioning time concludes.

In accordance with the invention, the positioning time known only to the drive processor in computers may be synthesized without extra hardware by selecting test reads that have no or little latency time thus making the CPU available rotation time equivalent to the positioning time as illustrated in FIG. 2. This is accomplished by initially screening test read candidates that under no-fault conditions, given a statistically significant number of trials, require two different read times respectively referred to as fast and slow. Slow read times require one more disk revolution to complete than fast reads. Normally an A to B read has only one no-fault read time. The dual time syndrome occurs when the positioning time and the disk rotation time are near equal and the read head 1 is equally likely to start reading either before or after the start of the read sector. As described in FIG. 3, when the positioning is slightly faster than the rotation time a fast read is achieved as in Case 1 and when the positioning time is slightly slower than the rotation an extra revolution is required to complete the read yielding a slow read as in case 2. This scenario also works in reverse. When the positioning time is slightly longer than the rotation time a latency of 1 revolution occurs. When the positioning time decreases to less than the disk rotation time the read is accomplished in one revolution less.

These test reads are termed in this invention as dual access reads (DAR) and are selected when they generate a near equal amount of fast and slows during calibration. A near balance such as a mix of 480 fast and 520 slow indicates that on average the latency is nil. Each DAR has two acceptable read times, N and either N+1 or N−1 revolutions (FIG. 3) that are measured by the computer CPU 12. Any other time indicates an exception and the read is preferably replaced as described later. Experience has shown that approximately 1 in 50,000 possible A to B test reads is a suitable DAR with a near balanced ratio between fast and slow reads. For comparison a 4 GB drive contains approximately $8 \times 10^6$ sectors and $64 \times 10^{12}$ $((8 \times 10^6)^2$ for all disks and read heads) possible A to B reads. This produces $1 \times 10^9$ DAR candidates that are suitable for test strings.

A feature of this invention is that it reduces sophisticated measurements to two possible binary outcomes of fast and slow DAR reads. These simple tests are repeated and the sum of the results such as 4 fast and 6 slow are quantified as a probability using what is known in statistics as a Bernoulli trial. The use of probability allows one quantity to accurately represent many repetitions of the binary fast-slow read test. It also allows a commonality among many test reads. A test read from A to B may be replaced with a test read from C to D involving different times without jeopardizing the continuity of the test results. Reads in a test string that have to be replaced when they are rendered obsolete due, for example, to a physical relocation of a sector can be replaced along with their corresponding calibration information even though they have a different fast slow ratio without distorting the reliability trends. In a similar manner, complete test strings and their calibration information may be replaced.

Figure 8:
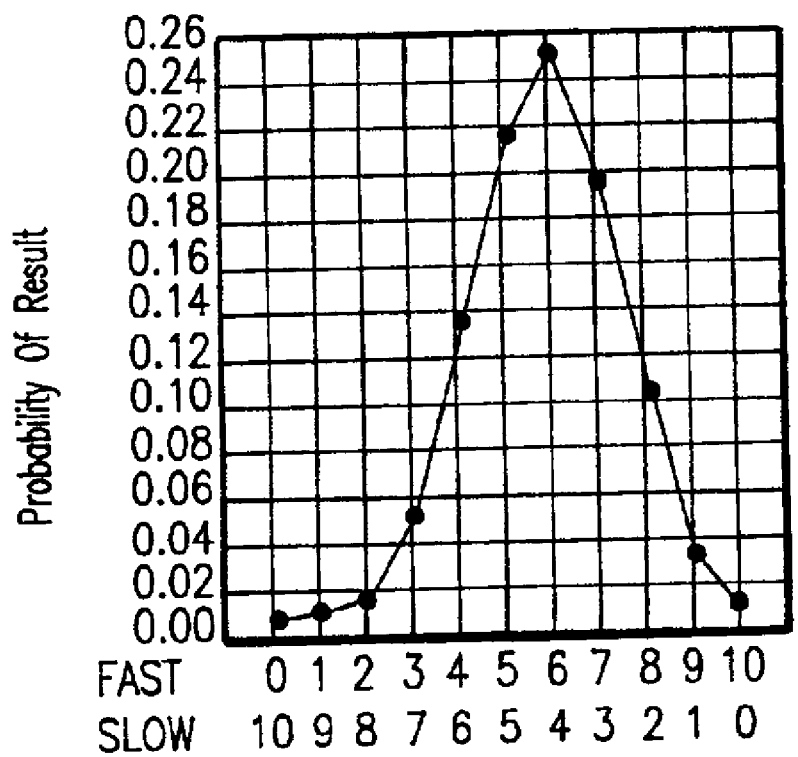
FIG. 8 is a graph of the possible fast and slow read combinations vs. the probability of their occurrence.

The Bernoulli trial provides the statistical probability for events involving only two possible outcomes. An example, penny flipping, provides only two outcomes, heads and tails, and by trial we know that on average 50% of the outcomes will be heads and 50% will be tails. Bernoulli teaches that if you flip a penny 10 times the odds of 5 heads and 5 tails are about 25%, the odds of 6 heads and 4 tails or 6 tails and 4 heads are about 20% and so on. In this invention, the fast and slow alternatives are not as a rule evenly balanced between alternatives as heads and tails. FIG. 8 shows an actual distribution for a probability for a DAR having a 58% fast and 42% slow mix during calibration. In this case the probability of 5 fast and 5 slow test reads is about 22% and the probability of 6 fast and 4 slow is about 25%.

Irrespective of the DAR probability, two basic patterns of actuator movement may be employed to diagnose between faults caused by actuator mechanical problems and those caused by the environment. One pattern shown in FIG. 1, A to B, involves a large spindle to outer edge traverse known as a sweep. This exposes the read head 1 to more of the internal environment surrounding the disk surface including particles of moisture and eroded recording material 15. Anomalies are more likely to be caused by adverse environmental conditions. Short traverse patterns such as B to C are more mechanically intense and less subject to the environment. Their performance is more indicative of mechanical degradation of actuator arm 2.

Under no-fault conditions, test read times can be corrupted by normal but transient events including RPM variations, data relocation of the disk and cache or memory-to-memory reads. Because stable disk RPM are important to this invention, all readings involving disk RPM that are outside of the normal range are preferably edited out of the test through an authentication process. After RPM authentication, DARs that produce deviant but constant results may be deleted and replaced. In addition, DARs that have minute read time on a transient or permanent basis, e.g., faster than any track to track read, as can occur when cache access is applied by the disk drive, may be edited out and replaced if the cashing continues.

In accordance with an advantageous feature of the invention, a "tip test" may be performed to verify accurate detection of the early signs of disk drive failure. In practicing the tip test, a computer programmed in accordance with the invention, may be tipped on its side prior to executing the test. The effect of gravity in many cases will alter the performance of the positioning time even on new computers. Returning the computer to its upright position will in most cases restore the no-fault condition.

The term "host" as used herein refers to any device or machine embodying a disk drive. For example, the host may be a PC, a consumer electronic device such as a digital camera, a personal video recorder, a mobile phone or a PDA, a medical device such as an EKG, an MRI or a sphygmomanometer, a military device, etc.

In keeping with the invention, calibration of disk drives may be performed by a calibration host. Disk drive testing may be performed by a testing host. In some embodiments of the invention, the calibration host and the testing host may be the same device. In other embodiments, the testing host and the calibration host may be distinct devices. In such embodiments, it is preferable that the testing host and the calibration host are connected via a communications link.

Calibration

Figure 4:
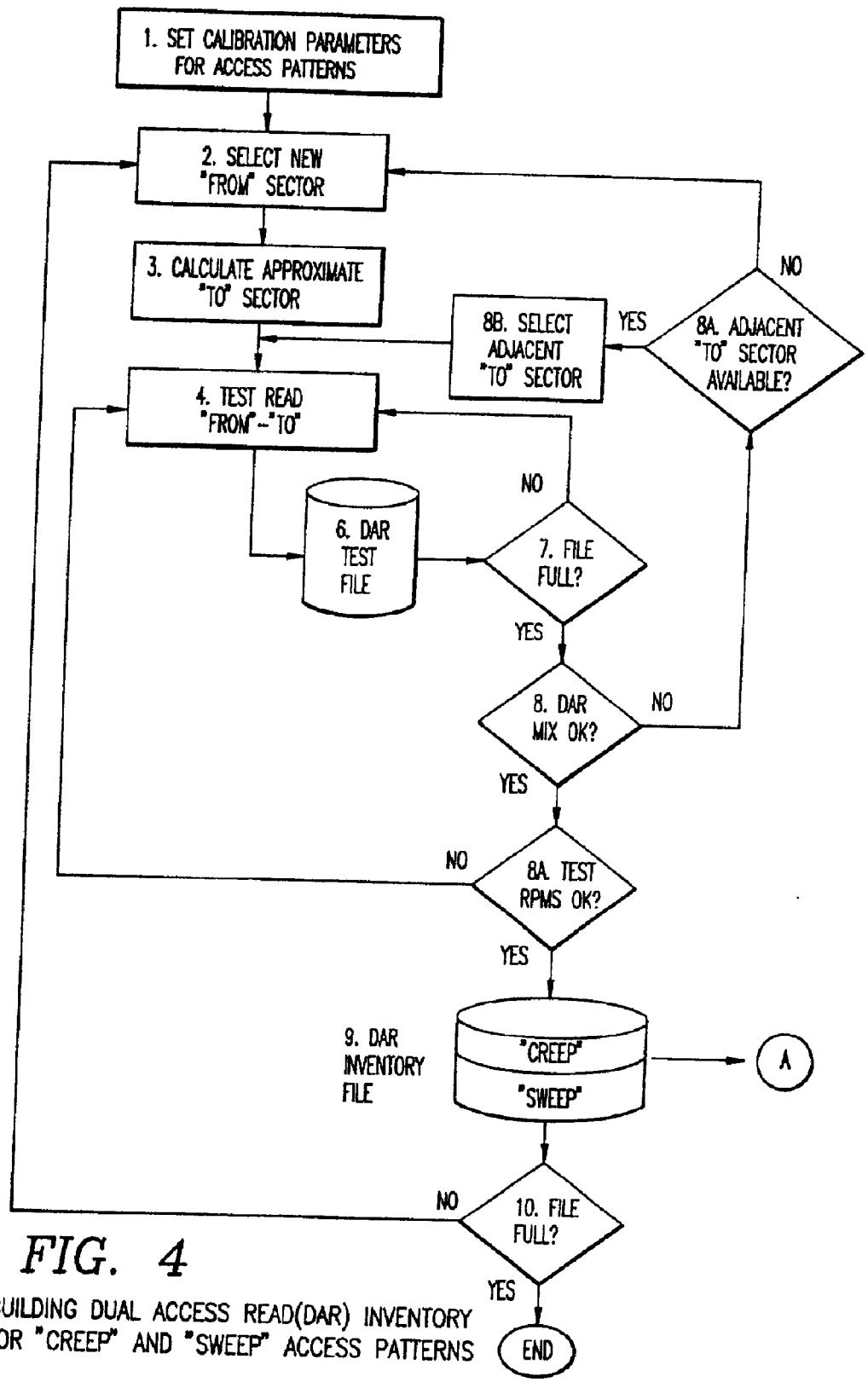
FIG. 4 is a flow chart illustrating a process in accordance with the invention wherein dual access reads are identified and stored.

Every disk drive design involving modifications in track or sector location, standard spindle drive performance and/or standard access arm performance is calibrated once by identifying all available DAR that fit the sweep and creep access patterns as described in FIG. 4. To avoid a prolonged search for eligible DARs a theoretical DAR is computed using design characteristics. If the DARs are not sufficiently balanced between fast and slow reads, a new "to" sector adjacent to the old one is selected. This has the effect of making slight modifications in the rotation and positioning time that may bring both closer to equality and produce a more even fast-slow balance. In step, 1 constants defining sweep and creep patterns including range of tracks to be traversed, acceptable spindle RPM ranges, range of acceptable DAR fast and slow read ratios which are representative of positioning time (FIG. 2) and basic disk design parameters including the speed performance of the spindle 5 and actuator arm 2. The process starts with the selection of a "from" sector; in step 2, the "A" in previously stated A to B read, and uses the design parameters to compute probable sweep and creep "to" sectors where the disk rotation time closely approaches the disk positioning time as described in connection with the DAR of FIG. 2. Each selected read is repeated to determine if the fast and slow ratio is acceptable in steps 4 to 8. More particularly, the selected DARs may be stored in a DAR test file in step 6. When the DAR test file accumulates a prescribed number of test reads, it is considered full, step 7. The DAR revolution mix is then checked in step 8. If the mix is acceptable, e.g., between 40% and 60% N revolutions and between 40% and 60% N±1, then the test read is stored in a DAR inventory file as either a creep or a sweep. If the ratio is unacceptable alternate sectors adjacent to the original sector and its track are attempted in step 8A. If the adjacent sector is available, then it is selected as the new destination sector and the procedure is repeated from step 4. If the adjacent sector is not available, then the procedure reverts back to step 2. Additionally the reads are checked for acceptable RPM and those reads falling outside the constant speed range are replaced with new reads in a return to step 4. The sweep and creep DAR with acceptable fast and slow ratios measured during normal spindle RPM are stored in a DAR inventory file in step 9. It is desirable to store a sufficient number of DARs to allow for ready replacement of old DARs that have become corrupt over the useful life of the disk. Preferably, the DAR inventory file includes a maximum of about 300 creeps and about 300 sweeps. However, the capacity of the DAR inventory file may be adjusted as system requirements dictate. Test reads are preferably executed until the DAR inventory file is full.

Figure 5:
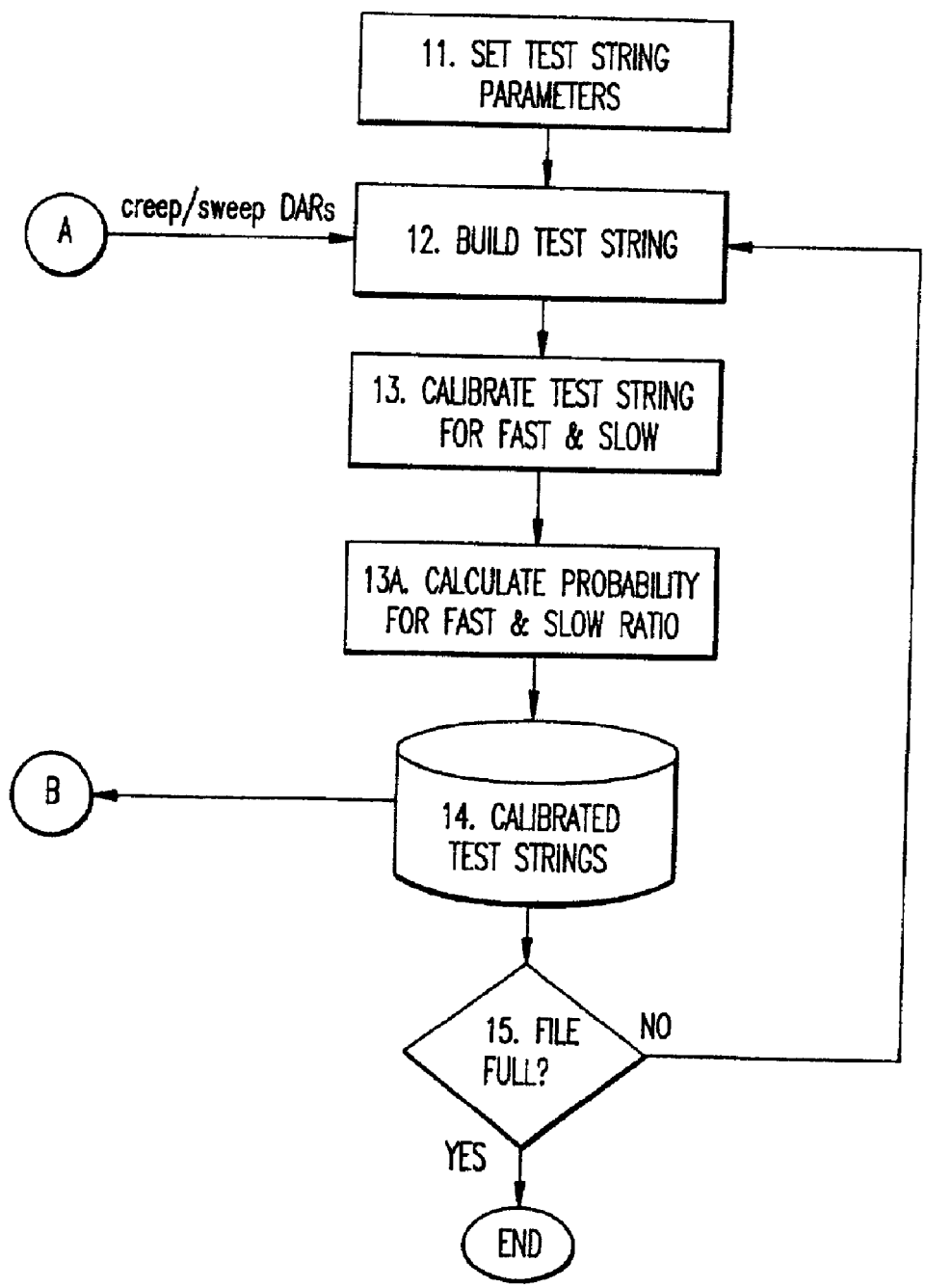
FIG. 5 is a flow chart depicting a procedure for building and calibrating test strings in accordance with the invention.

Once the DARs have been identified and saved, the test string may be built. FIG. 5 depicts a preferred procedure for building the test string. In step 11 the test string parameters are set. Preferably, the test string includes a half string of sweeps and a half string of creeps to permit a probable diagnosis of environmentally caused faults and mechanically caused faults. The user can correct some environmentally caused faults. Mechanical faults suggest file backup is prudent and eventually require disk drive replacement. To assure that the DARs are true "mechanical reads" and not cache accesses, filler reads may be inserted between the DARs, in accordance with the parameters set in step 11, to occupy any available cache and free the next DAR for a mechanical read. In the preferred embodiment, the test string includes about 8 creeps and 8 sweeps and about 16 fillers for a total of about 32 reads.

In accordance with an aspect of the invention, CPU 12 selects sweeps and creeps from the DAR inventory file (see step 9 of FIG. 4) and assembles the sweep and creeps according to the above-mentioned parameters (step 12). The test string may then be calibrated (step 13). Preferably, the test string is calibrated by executing the DARs a plurality of times, e.g., 1000 times, and identifying and recording the number and percentage of fast and slow DARs for each read in the test string and the probability that this percentage will occur. See FIG. 5, steps 13 and 13A. This probability is the standard against which test string probabilities will be measured in FIG. 7, step 25. This probability may be calculated following the same procedure as the calculation of probability for test string data described in FIG. 7, step 24.

The calibrated test strings may then be stored in a test string file for later use in testing the disk (step 14). Preferably, the test string file contains a maximum of between 50 and 100 calibrated test strings to allow for ready replacement if one of the test strings becomes defective due to sector relocation or some other disqualifying condition. Of course, the number of test strings contained in the test string file may vary as conditions warrant.

Testing

Figure 6:
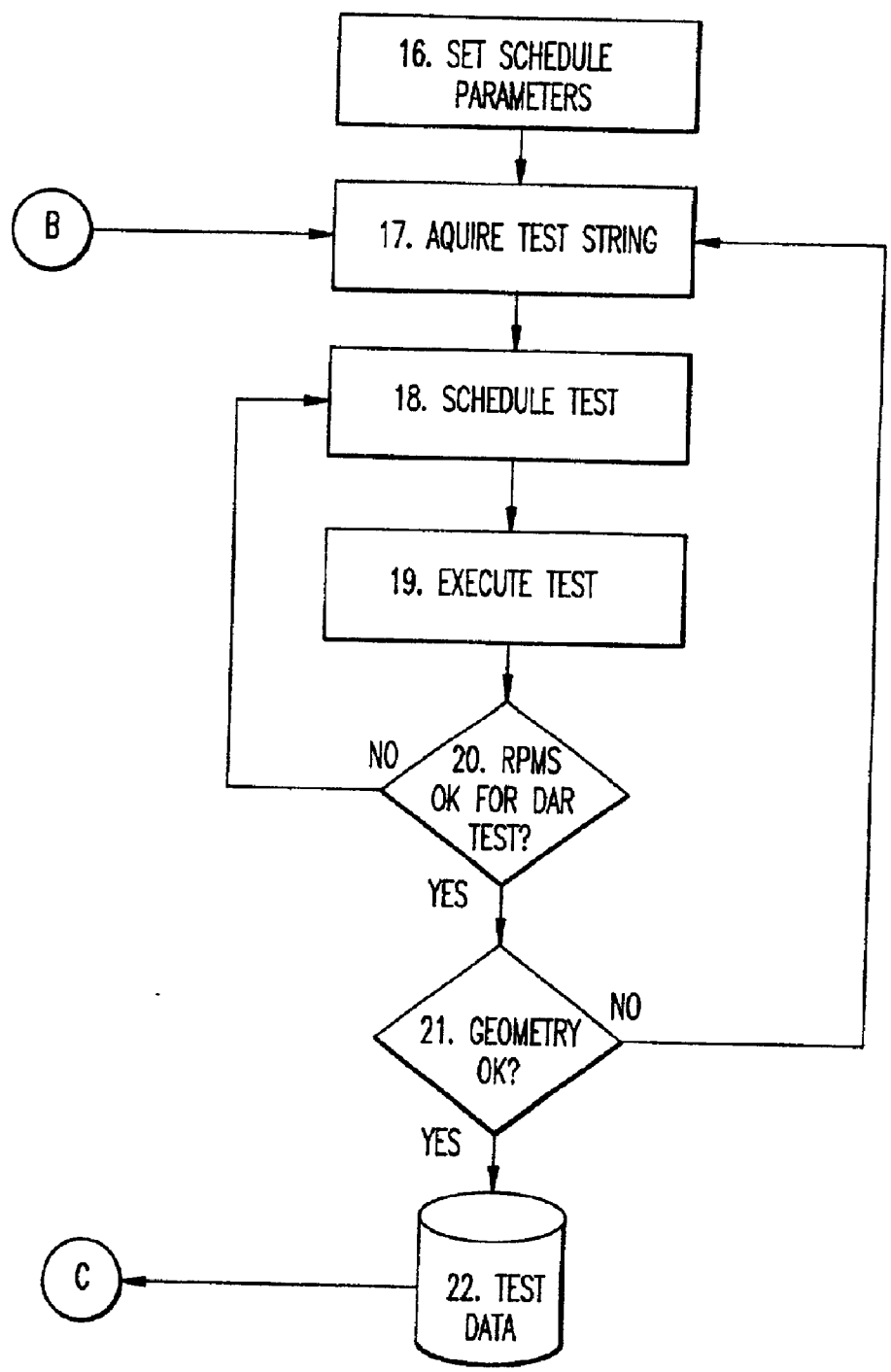
FIG. 6 is a flow chart showing execution of a disk testing procedure in accordance with the invention.
Figure 7:
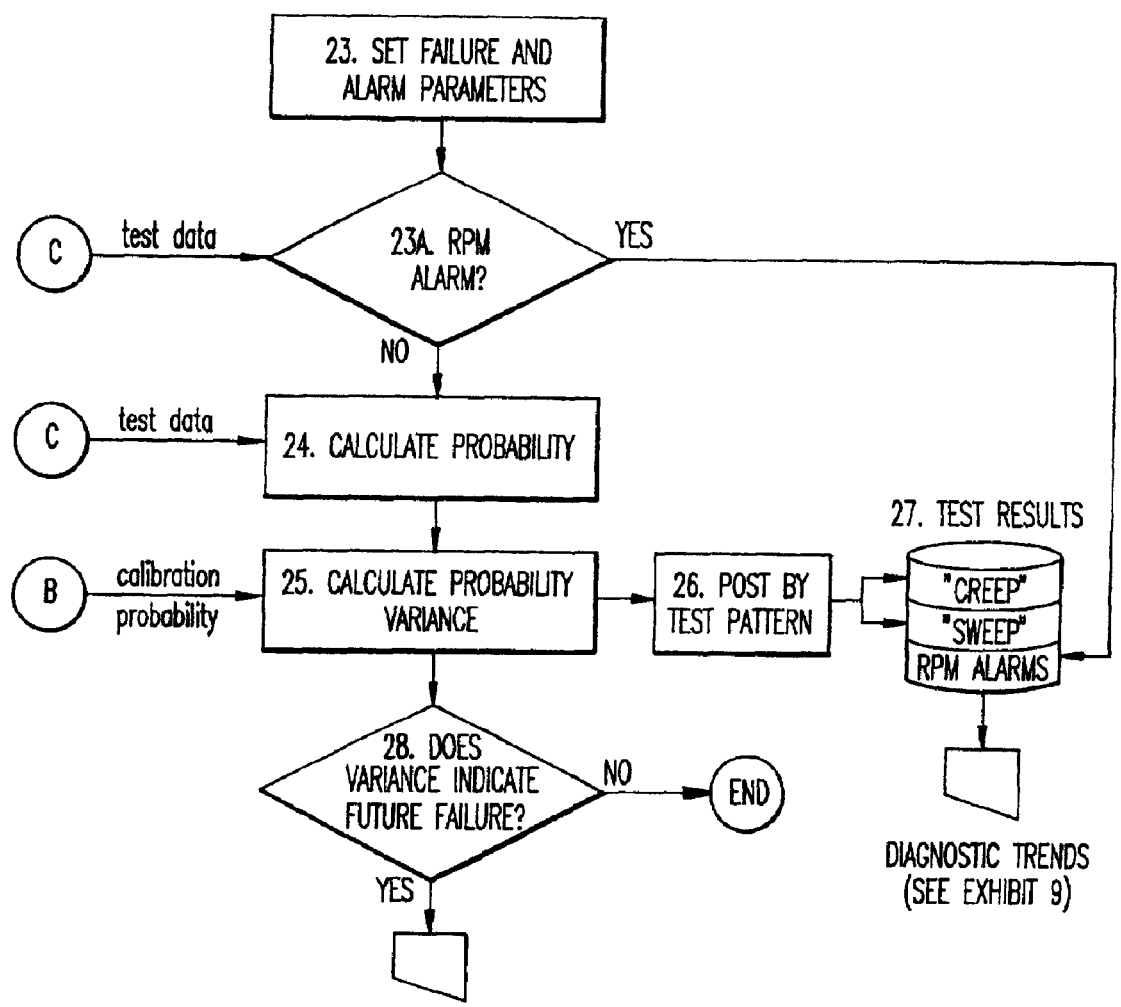
FIG. 7 is a flow chart depicting a predictive failure analysis using data acquired during the testing procedure of FIG. 6.

FIGS. 6 and 7 illustrate the testing procedure. Once the test string is generated, the disk drive may be tested at any time and is preferably tested periodically, e.g., hourly, daily, weekly, etc., either permanently or on a temporary basis. The test schedule parameters are set in step 16. Advantageously, normal operations of the computer are not significantly affected during disk testing. The disk test preferably uses only about 10 seconds of disk drive activity time. In accordance with a preferred feature of the invention, the CPU 12 schedules disk tests during periods when the disk is least likely to be accessed. Therefore, the test may be executed during the night hours when computer usage is often minimal. In addition, the test is preferably repeated a plurality of times within a prescribed time period. The frequency of repetition will depend on a number of factors and it may be adjusted as desired. For example, in particularly preferred embodiments, the test may be performed as frequently as every 24 minutes during an 8–10 hour period.

Each test preferably executes the test string a plurality of times. In preferred embodiments, the test string is executed about 10 times during each test. Positioning times for each DAR (sweep or creep) in the test string are preferably measured by CPU 12 and stored in a test data file. These positioning times may be further separated into fast and slow sweeps and creeps.

During each read operation, the spindle speed is monitored as previously described in connection with the calibration procedure. CPU 12 then checks the spindle speed for each of the test string reads. If the spindle speed is outside of an acceptable range of the normal spindle speed (step 19) then a new test is executed. Otherwise, the positioning times for the fast and slow DARs of the test string stored during the calibration procedure (calibrated positioning times) and compared with the positioning times for the fast and slow DARs measured during execution of the test string (measured positioning times) (step 20). If the measured positioning times and the calibrated positioning times regularly differ by 10% or more, then it is believed that the geometry of the disk has changed since calibration due to the physical relocation of one or more sectors on the disk as a result of poor magnetics and other defects. Accordingly, a new test string should be acquired and the test should be executed again using the new test string. If the measured positioning times do not deviate from the calibrated positioning times by more than ±10%, then predictive failure analysis may be performed.

FIG. 7 depicts a process for performing predictive failure analysis. In a preferred procedure, CPU 12 calculates a probability of occurrence of a given distribution of fast and slow DARs that are indicative of the positioning performance of FIG. 2. This parameter is referred to herein as test data probability. The test data probability is preferably calculated using the binomial distribution formula also known as the Bernoulli trial described above. CPU 12 also determines the distribution or ratio of fast to slow DARs executed during the test procedure using the measured positioning times. This parameter is referred to as the DAR ratio. A DAR ratio is calculated for both creeps and sweeps. In step 25, the probability variance is calculated. This parameter refers to the difference between the no-fault calibration and the DAR ratio. For each read operation, the probability variance is stored in a test file, steps 26 and 27.

FIG. 8 depicts a graph showing an exemplary no-fault calibration for sweeps vs. a sweep DAR ratio. In keeping with a preferred aspect of the invention, in step 28 of FIG. 7, CPU 12 compares the sweep DAR ratio with the measured probability in forecasting disk failure. As indicated in FIG. 8, a sweep DAR ratio of 90% fast DARs and 10% slow DARs approximately yields a 3% probability. This indicates that a mechanical fault is present and the drive should be replaced. In contrast, a sweep DAR ratio of 70% fast DARs and 30% slow DARs yields a 20% probability that indicates that the drive does not need to be replaced. Although not shown, CPU 12 also compares the creep DAR ratio with the creep no-fault calibration. In accordance with the invention, when the creep or sweep DAR ratio yields a no-fault calibration below, e.g., 10%, warning signals may be generated to indicate that the disk drive is near failure. More particularly, when the no-fault calibration reaches a first level, e.g., 8%, a first warning signal is preferably generated to indicate that the disk is damaged and that it will soon need replacement. When the no-fault calibration reaches a second level, e.g., 4%, a second warning signal is preferably generated that indicates that the drive should be replaced. A third warning signal is preferably generated when the probability reaches a third level, e.g., 1%. This warning signal indicates that the drive can no longer reliably operate.

In another embodiment, predictive failure analysis may be performed by comparing calibrated positioning times to measured positioning times. This allows for more detailed warning signals to be generated. For example, by comparing calibrated positioning times for sweeps to the measured sweep positioning times, predictive information relating to internal environmental conditions such as contamination, excess moisture, high temperature, vibration, low pressure etc. may be generated. Correspondingly, by comparing calibrated positioning times for creeps to measured creep positioning times, predictive information relating to disk failure caused by mechanical malfunction of component disk drive assembly 10 may be generated.

Figure 9:
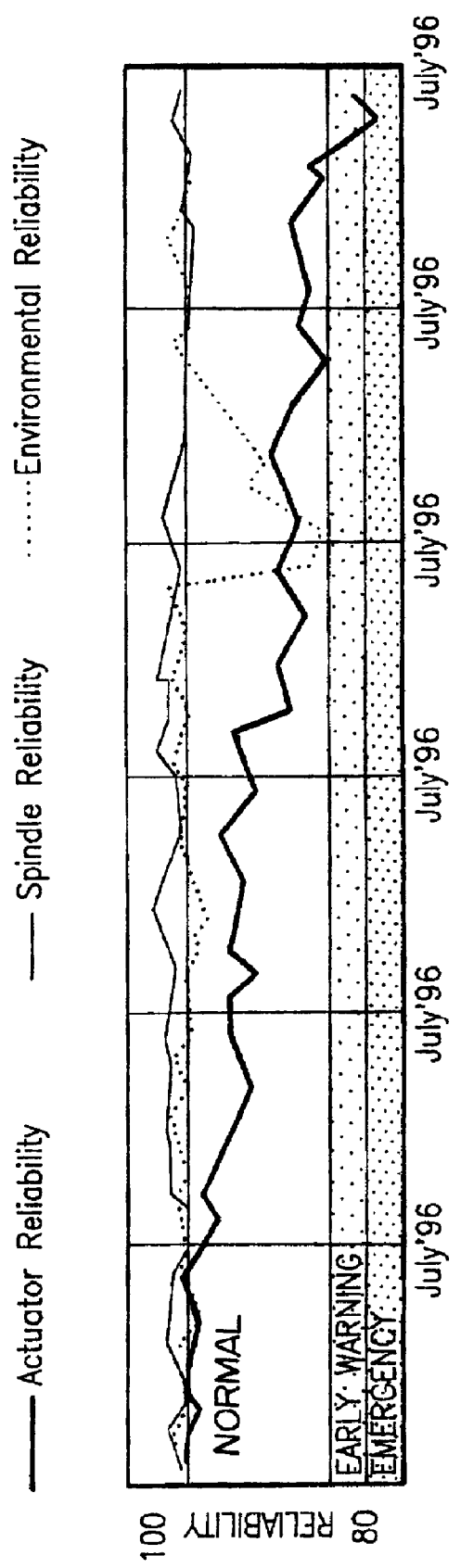
FIG. 9 is a diagram showing the deviation of sweep positioning time, creep positioning time and spindle speed from respective calibration standards over time.

FIG. 9 depicts a graph illustrating disk drive reliability over time in three phases as stored in the test file. Phase one is the reliability of the actuator arm 2, designated in FIG. 9 by the bold solid black line. Phase 2 represents the reliability of the spindle 5 designated by the unbolded solid black line. Phase 3 represents the reliability of the disk based upon its internal environmental conditions designated by the perforated line. Reliability is determined by the degree to which the actual DAR ratios deviate from the calibrated DAR ratios and the degree to which the actual spindle speed deviates from the calibrated spindle speed. As illustrated, as reliability for each of the three phases approaches the 85% range, early warning signals are preferably generated. Such warning signals may include instructions to back up files to a separate storage medium or to inspect the drive for defects. As reliability declines into the 80% range, emergency warning signals. Such warning signals may include instructions to replace the drive, or in severe cases, to replace the entire computer.

For ease of analysis, the chart of FIG. 9 may also be displayed as a composite trend line with the three trend lines combined.

A particularly preferred aspect of the invention is that each warning signal maybe automatically dispatched directly to the user, to authorized computer repair personnel, to the drive manufacturer and/or to any other desired recipient. Such dispatch may occur via a computer network such as the Internet or a private/secure network.

Specific embodiments of the invention may be particularly useful to service organizations to provide services to individual computers on a network such as the Internet or a local area network. Service organizations include large operators of computers providing services to their constituents, commercial service organizations such as providers of computer maintenance services, warrantors of computer viability, and providers of computer hardware and software. In one such embodiment, a computer center generates the individual failure probability analyses based upon disk drive test data provided to it over the network. The computer center down loads a small software package that is automatically installed in the served computer population for the purpose of collecting operational data and transmitting it to the central computer. Included in the down load are calibrated read test strings for the type of disk drives to be monitored. A calibration is conducted for each type of disk drive and includes spare read test strings which are stored at the central computer and used to replace read test strings in the served computer that have become obsolete. The central computer tracks the reliability of the disk drive for each shift and generates a reliability trend chart showing the lifetime reliability of the disk drive as it pertains to the spindle 5, the actuator arm 2 drive and to the environment in which they operate, FIG. 9. A composite of these three reliability trends may also be displayed. When the reliability drops below a predetermined level the central computer is notified with an alarm notice and the user receives a trouble/solution notice explaining the trouble and suggesting solutions.

More particularly, a warrantor, maintainer, manufacturer or user of on-line computers may process, at the computer center, test data collected from on-line computers throughout the network. The calibration of various designs of disk drives may be performed and stored at the computer center, FIG. 3A step 1. A test string and a test data acquisition program may be down loaded and installed on the on-line computer, step 2. The test data acquisition program is preferably no larger than about 16 k. This program regularly collects test data requiring about 200 seconds of disk drive activity time per 8 hours of computers use, step 3. Test data may then be periodically transmitted, e.g., e-mailed, to the central site for diagnosis, step 4. When anomalies are detected and diagnosed alarm notices and the diagnostic drive reliability trend chart (FIG. 9) may be transmitted, e.g., e-mailed, to the computer user along with suggested solutions such as backup up data on the suspect disk and upgrade the reliability of the disk drive, step 5.

The embodiments described above are directed to testing of hard drives that are resident in a standard PC, i.e., the disk drive host is a PC. The invention is also applicable to disk drives disposed in other drive hosts such as consumer electronic devices, medical devices, military devices, etc. These types of devices typically employ miniature drives having a form factor on the order of about 2.5 cm (1 inch). A popular miniature drive employed by many devices is the IBM Microdrive II having the specification set forth below.

| Model Name | Microdrive DSCM-11000 |
| --- | --- |
| Form Factor | 2.5 cm (1.0 inches) |
| Capacity | 1.0 GB |

-continued

| Model Name | Microdrive DSCM-11000 |
|---|---|
| Data Heads | 2 GMR |
| Data Disks (25 mm) | 1 (Glass) |
| Areal Density (Max) | 15.2 Gbits/in2 |
| Rec. Density (Max) | 435 KbPI |
| Track Density | 35 KTPI |
| Rotational Speed | 3600 RPM |
| Latency (Average) | 8.33 msec |
| Med. Trans. Rate (Max) | 59.9 Mbits/s |
| Seek Time (Ave) | 12 msec |
| Power consumption | 0.495 W @ 3.3 VDC |
| Non op. shock tol. | 1500 G/1 msec |
| Weight | 16 grams (.56 oz) |
| H x L x W (CF-II) | 5 x 42.8 x 36.4 mm |

Figure 10:
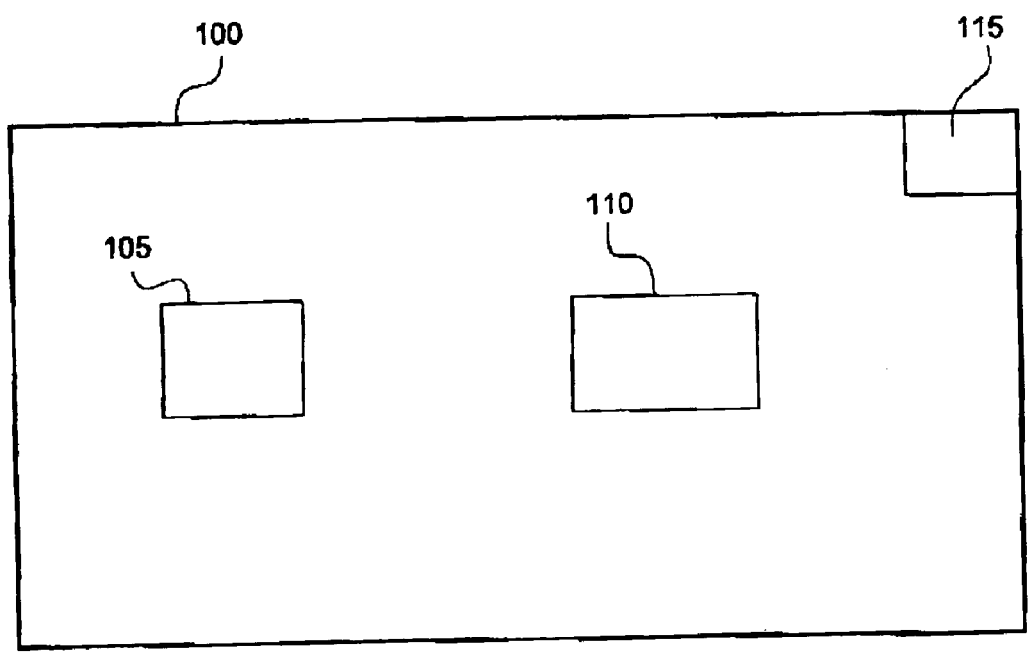
FIG. 10 is a block diagram of a secondary electronic device according to the invention.

As illustrated in FIG. 10, a preferred host may include secondary electronic device 100 that includes at least a disk assembly 105, preferably including a microdrive, and a processor 110 associated with the disk. The processor 110 is preferably provided and/or programmed with microcode for controlling the disk assembly 105. In some embodiments, the secondary electronic device may include an I/O port 115 to facilitate communication with other devices. In some embodiments, the disk drive assembly may be readily removable from the host and readable in a standard PC by way of, e.g., a conventional card reader.

In accordance with an embodiment of the invention, the host incorporates secondary electronic device 100. In accordance with the procedures described herein, a disk is preferably calibrated during the manufacturing process and the test routines may be installed in the microcode of processor 110 either during the manufacturing process or at a later time. In keeping with the invention, the selected test strings and mechanical exercises may be stored on the disk for evaluation. If the disk performance drops below an acceptable threshold, the host generates an alert to warn the user.

Figure 11:
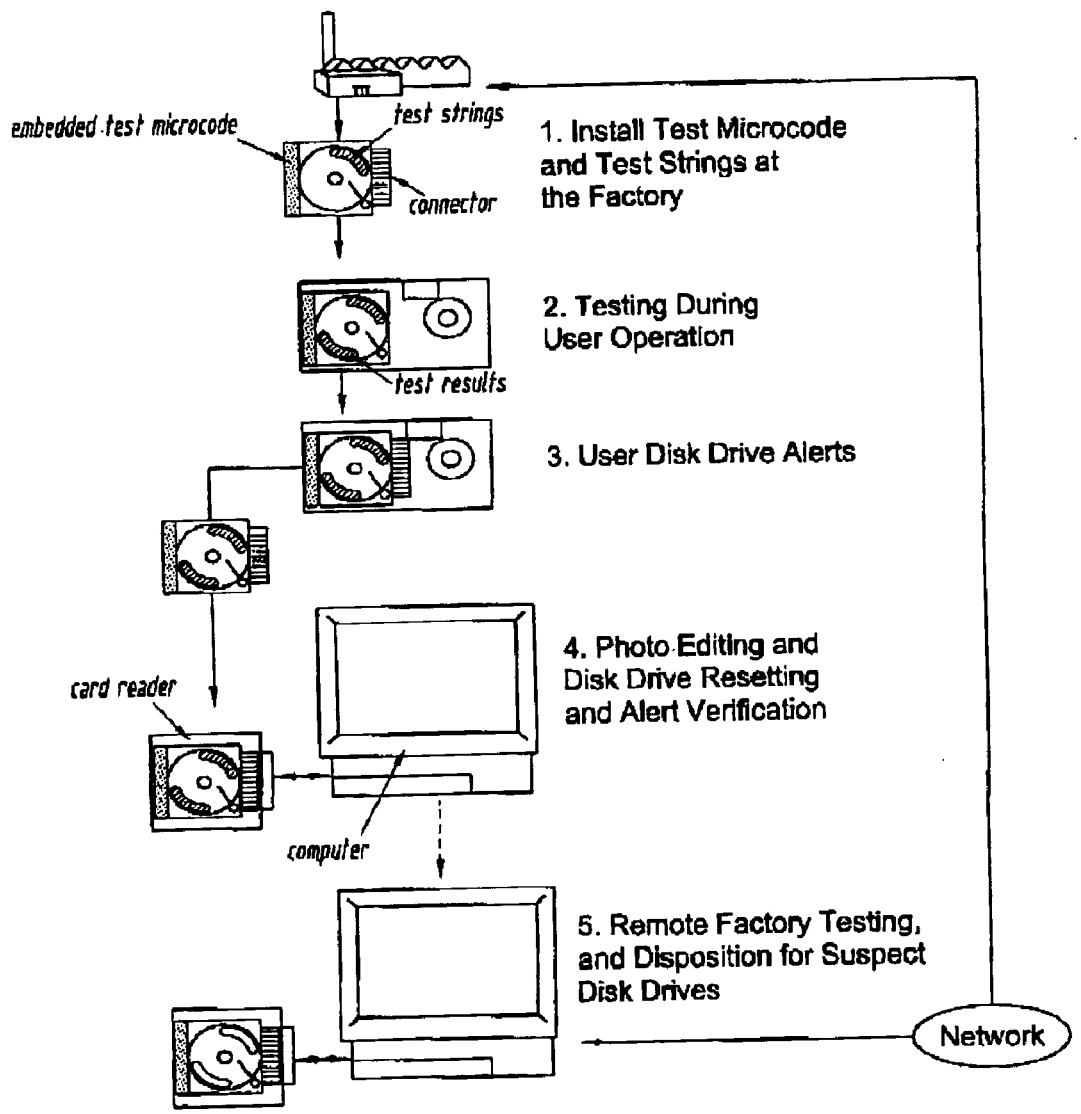
FIG. 11 is a flow diagram illustrating the operation of an embodiment of the invention.

FIG. 11 illustrates a particularly preferred mode of operation where the host is a digital camera. In step 1, test microcode and the test strings generated according to the procedures described above may be installed in the processor 110. In step 2, the drive is tested. The host may perform testing as described hereinabove. However, due to processor and/or power limitations it may be desirable to perform abbreviated testing, e.g., conduct fewer DARs. For example, where the host has limited power (battery pack or the like), the test duration is preferably three seconds or less. However, testing may be completed by placing the microdrive in a powered PC. Accordingly, testing may be performed during normal operation of the camera or, independently of normal operation according to either a user defined or predetermined schedule. The test results are stored on the disk as part of the disk drive's lifetime performance record. In step 3, the test results are then compared to the calibrated results. If the drive performance as reflected by the test results drops below an acceptable threshold, the host generates an alert. The alert may be in the form of a screen display, an LED indicator or any other type of indicator that will effectively inform the user. In step 4, the user may consult the disk drive manufacturer or warrantor to determine whether more extensive testing on the disk is recommended. For example, the user may remove disk assembly 105 from the host and insert it into a testing host where more extensive testing can be performed, e.g. during photo editing, to provide a more accurate indicator of the state of the disk. If this secondary testing verifies the alert, then the disk should be returned to the manufacturer. Alternatively, the user may remove the disk assembly 105 from the host prior to testing, insert the disk assembly 105 into a testing host, e.g., a PC, and perform all testing in the PC.

In accordance with another embodiment of the invention, the host may be a personal video recorder (PVR) incorporating secondary electronic device 100. PVRs are fast replacing VCRs as they are easily programmable so that a viewer can define the recording schedule weeks or more in advance. In addition, typical PVRs can store up to 60 hours of programming. In keeping with the invention, a standard PVR is preferably provided with secondary circuit 100 including the I/O port 115. Typical PVRs may include removable disks or fixed disks.

In operation, the disk is preferably calibrated during the manufacturing process and the test routines may be installed in the microcode of processor 110 either during the manufacturing process or at a later time. The selected test strings, mechanical exercises and test results may be stored on the disk and uploaded to a testing center for evaluation.

Figure 12:
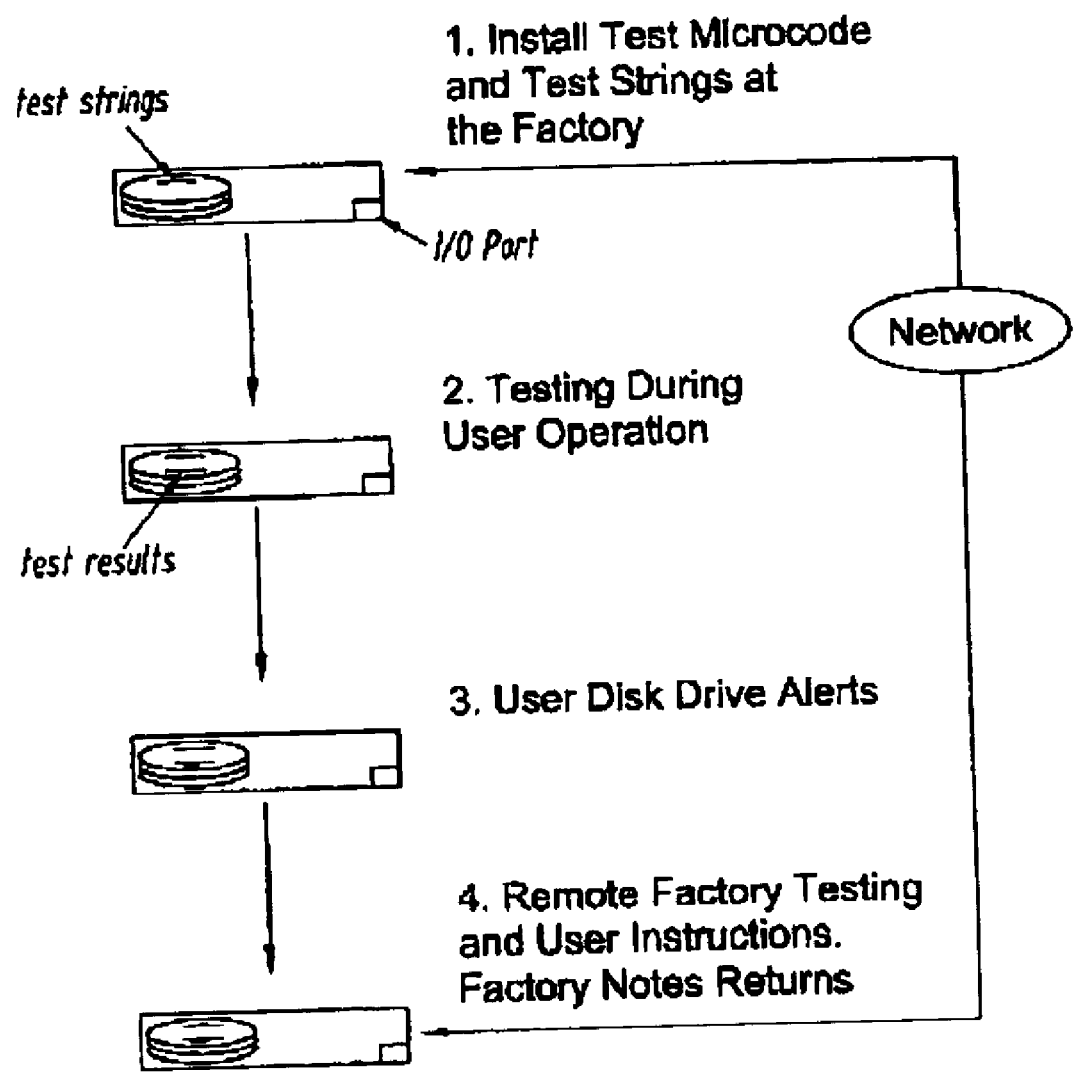
FIG. 12 is a flow diagram illustrating the operation of another embodiment of the invention

FIG. 12 depicts a particularly preferred mode of operation for a PVR in accordance with the invention. In step 1, test microcode and the test strings generated according to the procedures described above may be installed in the processor 110 either by the manufacturer at the factory or the user may download the test microcode and the test strings via a communications link or carrier wave. In step 2, the drive is tested. The host may perform testing as described hereinabove. Accordingly, testing may be performed during normal operation of the PVR or, independently of normal operation according to either a user defined or predetermined schedule. The test results are stored on the disk as part of the disk drive's lifetime performance record. In step 3, the test results are then compared to the calibrated results. If the drive performance as reflected by the test results drops below an acceptable threshold, the host generates an alert. The alert may be in the form of a message stored on the disk for display when the PVR is operated in connection with a display screen. The alert may also be in the form of an LED indicator or any other type of indicator that will effectively inform the user. In step 4, the further, more extensive testing may be conducted on the disk. For example, the PVR may communicate with a testing device through I/O port 115 and request testing of the disk. The testing device may then send test messages back to the PVR including instructions for the PVR to perform various testing operations such as those described herein in the section entitled "TESTING". The remote testing device may also request that the PVR perform other testing operations. Communication between the PVR and the remote testing device may be via a network such as a LAN or WAN. Communication may be wired, e.g., through POTS, DSL, Ethernet or some other wired connection. Alternatively, communication between the PVR and the remote testing device may be via a wireless medium, satellite, RF connection, microwave connection, optical connection etc. If this secondary testing verifies the alert, then the user may be informed to return the PVR.

INDUSTRIAL APPLICABILITY

The disk failure prediction system of the present invention may be used to analyze disk drives in all types of hosts including digital cameras, PDA's and computers including, but not limited to PC's, and mainframes. Accordingly, the invention is particularly useful for hard disk manufacturers as it allows them to ascertain certain read standards for factory fresh disks that may be compared to data generated by periodically testing the disk to more accurately monitor the useful life of the disk.

Further, the invention is particularly useful for host manufacturers. Typically, host manufacturers purchase disks from hard disk manufactures and incorporate the disks into host devices that are sold to the users in an assembled state. The invention may be sold directly to the customer at the time of purchase of the host device. Alternatively, the host device manufacturer may use the disk failure prediction system to predict disk failure well before such failure occurs. This provides the host device manufacturer a variety of business advantages including the ability to offer its customers a warranty directed to replacing the disk before failure.

While various embodiments of the present invention have been described, it should be understood that they have been presented by way of example only. Additional modifications and variations of the described embodiments within the scope of the appended claims will be apparent to the skilled artisan.

We claim:

1. An article of manufacture comprising a computer usable medium having computer readable program code embodied therein for predicting failure of a disk drive, the computer readable program code comprising:

program code for causing a calibration host to generate a test string including a plurality of performance sensitive reads, each performance sensitive read including one of a first and second read;

program code for causing the calibration host to determine a probability of occurrence of a given ratio of first reads to second reads in the test string and for storing respective probabilities as calibration parameters for the test string;

program code for causing a testing host to periodically apply the test string to a disk drive;

program code for causing the testing host to monitor application of the test string to identify a number of first reads and a number of second reads performed during application of the test string and for establishing a ratio of first reads to second reads;

program code for causing the testing host to compare the ratio of first to second reads to respective calibration parameters and for generating a comparison result; and program code for causing the testing host to predict a possibility of disk drive failure as a function of the comparison result.

2. The article of manufacture of claim 1 further comprising program code for causing the testing host to measure the positioning times for the performance sensitive reads executed during application of the test string as measured positioning times.

3. The article of manufacture of claim 1 further comprising program code for causing the testing host to compare measured positioning times to stored positioning times and generate a warning signal indicative of disk drive failure responsive to the comparison.

4. The article of manufacture of claim 1 further comprising program code for causing the calibrating host to detect the spindle speed for each performance sensitive read in the test string and store the spindle speeds as calibrated spindle speeds.

5. The article of manufacture of claim 4 further comprising program code for causing the testing host to detect spindle speed for each performance sensitive read executed during application of the test string and store the detected spindle speeds as measured spindle speeds.

6. The article of manufacture of claim 5 further comprising program code for causing the testing host to compare the measured spindle speeds with the calibrated spindle speeds and to generate a warning signal indicative of disk drive failure responsive to the comparison.

7. The article of manufacture of claim 1 wherein the testing host and the calibrating host are the same device.

8. An article of manufacture comprising a computer usable medium having computer readable program code embodied therein for generating a disk drive failure indicator, the computer readable program code comprising:

program code for causing a host to generate access patterns for reads of data that test reliability of specific functions of disk drive components;

program code for causing the host to identify performance sensitive reads in each of the access patterns, each performance sensitive read including one of a first and second read; and program code for causing the host to generate a test string Including a plurality of the first and second reads, the test string, when applied to a disk drive, being an indicator of possible disk drive failure.

9. The article of manufacture of claim 8 wherein each performance sensitive read includes a read operation that, given a plurality of read repetitions, a percentage of the repetitions require N disk revolutions to complete and the balance of the repetitions require N±1 disk revolutions to complete.

10. The article of manufacture of claim 8 further comprising program code for detecting the spindle speed for each performance sensitive read in the test string and storing the spindle speed as calibrated spindle speeds.

11. An article of manufacture comprising a computer usable medium having computer readable program code embodied therein for predicting failure of a disk drive, the computer readable program code comprising:

program code for causing a host to periodically apply a test string read to the disk drive, the test string read including a plurality of performance sensitive reads;

program code for causing the host to monitor the application of the test string to identify a ratio of first to second reads from amongst the plurality of performance sensitive reads performed during application of the test string; and program code for causing the host to compare the ratio of first to second reads to respective calibration parameters for the test string and generating a warming signal indicative of possible disk drive failure responsive to said comparison.

12. The article of manufacture of claim 11 wherein the calibration parameter includes a probability of occurrence of a given ratio of first and second reads.

13. The article of manufacture of claim 11 wherein the first and second performance sensitive reads include respective first and second access patterns.

14. The article of manufacture of claim 13 wherein said program code for causing the host to compare the ratio of first to second reads further includes program code for causing the host to compare the first and second performance sensitive reads corresponding to the first access pattern with a first calibration parameter and compares the first and second performance sensitive reads corresponding to the second access pattern to a second calibration parameter.

15. The article of manufacture of claim 13 further comprising program code for causing the host to measure positioning times for the first and second reads corresponding to the first access pattern and store the positioning times as first positioning times and to measure positioning times for the first and second reads corresponding to the second access pattern and store the positioning times as second positioning times.

16. The article of manufacture of claim 15 further comprising program code for causing the host to compare the first and second positioning times to respective first and second calibrated positioning times and to generate a warning signal indicative of probable disk failure responsive to the comparison.

17. A system for predicting failure of a disk drive comprising:
a disk drive including a spindle, a disk operatively associated with the spindle and a disk reading mechanism including a read head; and
a programmed processor, said programmed processor inducing:
program code for causing a host to periodically apply a test string read to the disk drive, the test string read including a plurality of performance sensitive reads;
program code for causing the host to monitor the application of the test string to identify a ratio of first to second reads from amongst the plurality of performance sensitive reads performed during application of the test string; and
program code for causing the host to compare the ratio of first to second reads to respective calibration parameters for the test string and generating a warning signal indicative of possible disk failure responsive to said comparison.

18. A computer data signal embodied in a carrier wave for generating a disk drive failure indicator, comprising:
a program code segment for causing a host to generate access patterns for reads of data that test reliability of specific functions of the disk drive;
a program code segment for causing the host to identify performance sensitive reads in each of the access patterns, each performance sensitive read including one of a first and second read; and
a program code segment for causing the host to generate a test string including a plurality of the first and second reads, the test string, when applied to a disk drive, being an indicator of possible disk drive failure.

19. A computer data signal embodied in a carrier wave for causing a host to predict disk drive failure, comprising:
a program code segment for causing the host to periodically apply a test string read to the disk drive assembly, the test string read including a plurality of performance sensitive reads;
a program code segment for causing the host to monitor the application of the test string to identify a ratio of first to second reads from amongst the plurality of performance sensitive reads performed during application of the test string; and
a program code segment for causing the host to compare the ratio of first to second reads to respective calibration parameters for the test string and generating a warning signal indicative of possible disk drive failure responsive to said comparison.

* * * * *